United States Patent [19]

Comert et al.

[11] Patent Number: 5,324,470
[45] Date of Patent: Jun. 28, 1994

[54] METHOD OF FORMING A GASKET

[75] Inventors: Ahmet Comert, Chaineux; Dominique Petit, Housse-Belegny, both of Belgium

[73] Assignee: Norton Company, Worcester, Mass.

[21] Appl. No.: 947,583

[22] Filed: Sep. 21, 1992

Related U.S. Application Data

[63] Continuation of Ser. No. 712,015, Jun. 7, 1991, Pat. No. 5,164,136, which is a continuation of Ser. No. 404,933, Sep. 8, 1989, abandoned.

[51] Int. Cl.⁵ .................... B29C 35/04; B29C 47/06
[52] U.S. Cl. ...................................... 264/255; 264/259
[58] Field of Search ............................ 264/259, 255

[56] References Cited

U.S. PATENT DOCUMENTS

| 2,337,555 | 12/1943 | Hosking | 264/259 |
| 3,061,321 | 10/1962 | Smith | 277/180 |
| 4,247,510 | 1/1981 | Desverchere | 264/259 |
| 4,778,642 | 10/1988 | Lee et al. | 264/259 |

FOREIGN PATENT DOCUMENTS

| 230152 | 9/1959 | Australia | 264/259 |
| 3445715 | 1/1986 | Fed. Rep. of Germany | 264/259 |
| 2600933 | 1/1988 | France | 264/259 |

Primary Examiner—James Lowe
Attorney, Agent, or Firm—Brian M. Kolkowski

[57] ABSTRACT

Gasket formed in place on a surface of an article by producing an initial elongated bead of a selected cross-sectional area and bringing a mold cavity having the same cross-sectional area into contact with the surface to produce the final shape of the bead on the surface.

16 Claims, 5 Drawing Sheets

METHOD OF FORMING A GASKET

This is a continuation of copending application Ser. No. 07/712,015 filed on Jan. 7, 1991, now U.S. Pat. No. 5,164,136, which is a continuation of Ser. No. 07/404,933, filed Sep. 8, 1989, now abandoned.

BACKGROUND OF THE INVENTION

One of the universal elements found in the design and manufacture of products is the gasket or seal. Many industries, such as those in automotive, appliance, and packaging activities, use large amounts of gaskets for water sealing, dust sealing, air sealing, and the like. In many cases, the gaskets are in the form of custom-designed molded pieces or are supplied in roll form. In the latter situation, the user cuts a length from the roll and places it manually in the desired location in his product. In both cases (molded piece and roll form), there is a manual operation that is not only expensive, but does not fit into an automatic assembly line. In present-day manufacturing, in order to attain efficiency and to maintain a competitive position, it is necessary to have automation and low labor costs.

In order to overcome the above objections, the concept of forming a gasket "in place" has been developed i.e., making the gasket on the surface of the product with which it is to be used. This procedure is very promising and constitutes a growing sector in those industries that use gaskets. As a matter of fact, the installation of gasket forming "in place" has been proposed by several companies, particularly those manufacturing and selling robotic systems.

In general, the automatic forming of a gasket on the surface of a product requires the use of several techniques, namely robotics, material handling, and material compounding. Such an installation would typically consist of an automatic gun fed by a metering pump system operating through a mixing device for evenly mixing a two-component material, such as used for generating polyurethane. The gun is driven by a robot arm along an appropriate path while extruding the required amount of material. In such installations, the heaviest investment is in the robot, which is usually a 2 or 3 axis portic type. The handling equipment usually consists of two metering pumps, each handling one of the two reactive components of the material to be used for the gasket. These metering pumps supply appropriate amounts of each component and introduce them to a static or dynamic mixing device.

In the past, the material used has generally been a two-part flexible polyurethane, which can be foamed or unfoamed. If the material is foamed, this is usually accomplished by the use of $CO_2$ generated by the reaction of one of the components with moisture contained in the other component. Low viscosity components are usually used, since it is easier to mix them.

The low viscosity components of such a system are very appropriate in the case of a flat gasket, i.e., a gasket applied to a single plane surface and where the cross-sectional shape can be a substantially semi-oval shape. Because of their low viscosity, such materials will not hold other shapes (rectangular or triangular, for instance) and, because they are liquid, a tridimensional (x, y, z) application is not possible; in such a case, the material will flow and will not hold a uniform shape.

While certain high-viscosity materials do not have this deficiency, they have other problems. For instance, if a bead of high viscosity material is laid by extrusion onto a surface in the shape of a closed figure, the cross-sectional shape may be indeterminate at the point where the "ends" of the extrusion come together. The ends will either be somewhat separated and leave a section of reduced cross-sectional area or they will overlap and produce a section of greater than desired cross-sectional area. Either of these situations is unacceptable where a gasket of absolutely uniform shape and cross-sectional area is desired.

It can be seen, then, that a low viscosity gasket material is limited to single plane surfaces where the cross-sectional shape is unimportant, while high-viscosity materials give problems at the "start and stop" location. These and other difficulties experienced with the prior art systems have been obviated in a novel manner by the present invention.

It is therefore, an outstanding object of the invention to provide a method for forming a gasket in place on a surface that lies in other than a single plane.

Another object of the invention is the provision of a process for the "in place" application of a gasket material with a desired cross-sectional shape that is other than a natural liquid bead.

A further object of the present invention is the provision of a method for forming a gasket of highly viscous material in a closed figure and with a uniform cross-sectional shape even at the "start and stop" position.

It is another object of the present invention to provide a method for forming an annular gasket "in place" with a uniform cross-sectional shape though the entire length.

A still further object of the invention is the provision of gasket which is formed in place and which has a uniform cross-sectional form and area throughout.

It is a further object of the invention to provide apparatus for forming an annular gasket in place with a uniform cross-sectional shape in its entire length.

With these and other objects in view, as will be apparent to those skilled in the art, the invention resides in the combination of parts set forth in the specification and covered by the claims appended hereto.

SUMMARY OF THE INVENTION

In general, the invention has to do with a gasket formed in place on a surface of an article by producing an initial bead of a viscous material, the bead having a selected cross-sectional form and area. A mold having an elongated cavity, having the same cross-sectional area as the initial bead, is brought into contact with the surface to produce the final shape of the gasket on the surface.

More specifically, the initial bead can be produced (a) by extruding it onto the surface, (b) by extruding it into the elongated cavity, (c) by injecting it into the elongated cavity, or (d) by first forming the article by injection molding, then bringing the elongated cavity into contact with the said surface of the article so formed, and injecting the viscous material into the space defined by the said surface and the elongated cavity.

DESCRIPTION OF THE PREFERRED EMBODIMENT

Figure 1:
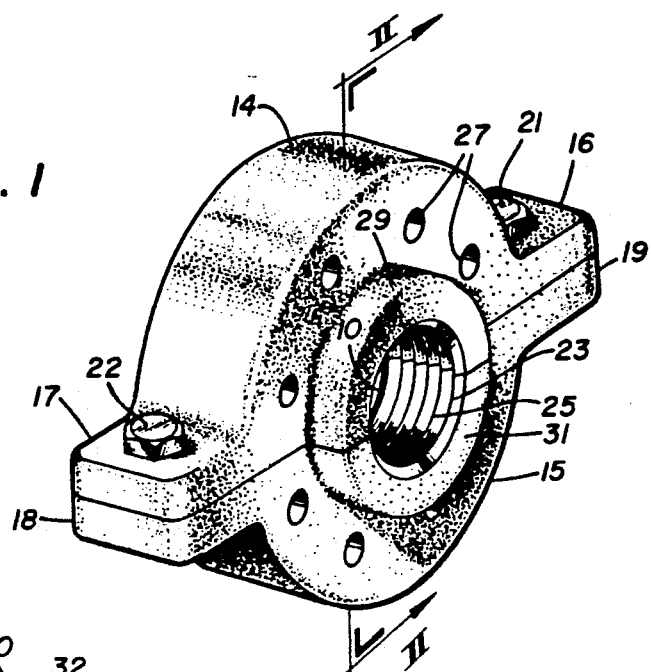
FIG. 1 is a perspective view of a joint using a gasket make in accordance with the principles of the present invention.
Figure 2:
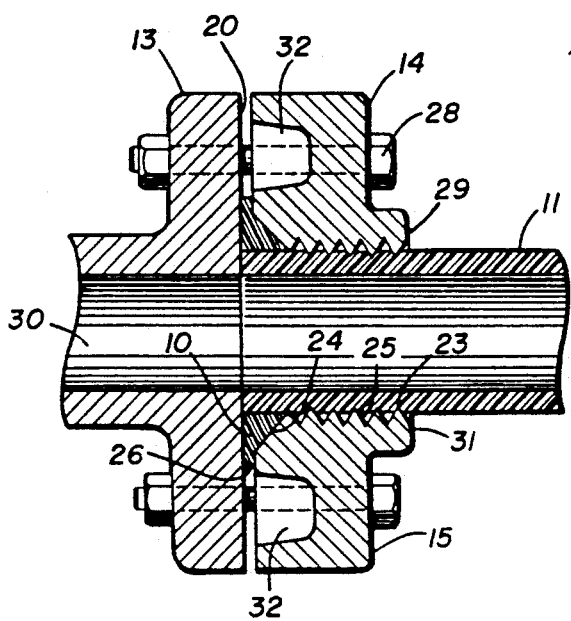
FIG. 2 is a sectional view of the joint taken on the line II—II of FIG. 1.

Referring first to FIGS. 1 and 2, wherein are best shown the general features of the invention, the gasket, indicated generally by the reference numeral 10, is shown in use as a seal in a joint, such as an adapter flange for pipes.

The flange consists of two similar bodies 14 and 15. The upper body 14 is provided with arms 16 and 17, while lower body 15 is provided with similar arms 18 and 19. The two bodies have together a disk-like configuration and have an axial bore 23 whose surface is provided with peripheral serrations 25. The bodies are provided with bolt holes 27 spaced on a standard centerline circle. The main bodies 14 and 15 are provided with axially-extending arcuate protuberances 29 and 31, respectively, which define a hub extending from one side of the assembly. Bolts 21 and 22 hold the bodies 14 and 15 together.

FIG. 2 shows the manner in which the bodies 14 and 15 are provided with pockets 32 located between the bolt holes 27. The adapter flange is shown in use in attaching a plastic pipe 11 to a flange 13 of an article 12, which article may be another pipe, a valve, or the like.

In order to complete the assembly, the flange 10 is first mounted on the pipe 11 and is then bolted to the flange 13. When the bolts 21 and 22 are drawn up completely, the seal or gasket 10 on the flange 13 fits into a conical counterbore 24 formed on the bodies 14 and 15. The bolts 28 fit in the bolt holes 27 and draw the adapter flange against the face or surface 20 of the flange 13, thus squeezing the gasket 10 between them to provide a water-tight seal.

The gasket 10 is formed of an elastomer and is formed "in place" on the face or surface 20 of the flange 13 of the article 12. The nature of the elastomer, as well as the apparatus and method for forming the gasket in place, are the subject of the present invention. As is evident in FIGS. 2 and 3, the gasket 10 has a generally triangular cross-section with a slight rib or flange 26 extending radially from one base. In other words, the gasket has an intricate form which makes it particularly appropriate for illustrating the principles of the present invention.

Figure 3:
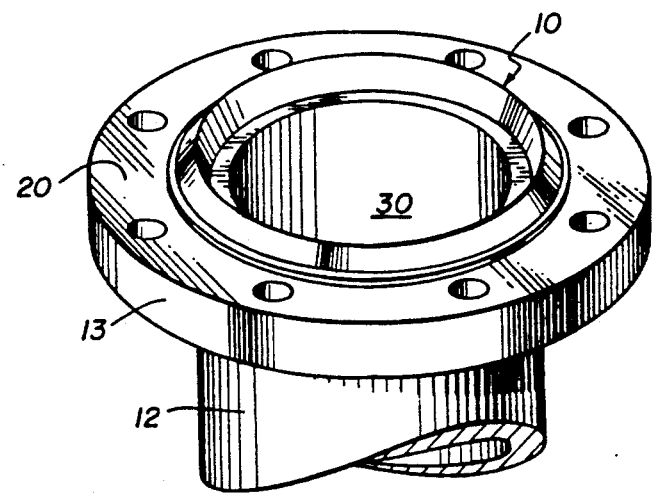
FIG. 3 is a perspective view of an article forming part of the joint and showing the gasket of the invention in operative position.

FIG. 3 shows the gasket 10 after it has been formed "in place" on the surface 20 of the flange 13 on the article 12. For the purpose of illustrating the invention, the article is shown as having a bore 30, while the gasket 10 is shown as a closed figure and as an annulus. For the purposes of this description, an annulus is defined to mean the solid body whose surface is generated by a closed plane figure that is moved in a path about a central line, while maintaining a constant orientation to that line; under this definition, the cross-sectional shape can be any plane figure (not just a circle, as in the case of a toroid), the movement can take place along any closed figure, including a circle or a rectangle with rounded corners, and the generating figure can also move up or down relative to the central line (not just remaining in a single plane perpendicular to the line).

The gasket 10 is formed of a moisture curable semi-IPN (interpenetrating polymer network) described in patent application Ser. No. 140,851 filed on Jan. 5, 1988 and entitled "MOISTURE CURABLE HOT MELT ELASTOMERS", which description is incorporated by reference into the present case. As described in that patent application, it has been found that novel and useful types of materials (especially useful for hot melt type sealants) can be made by blending at least two components: (a) a generally non-reactive thermoplastic synthetic polymer with at least moderate flexibility, i.e. a noncrosslinkable elastomer such as styrene-isoprene-styrene block copolymer, styrene-butadiene-styrene block copolymer, polyisobutylene, styrene-ethylene-butylene-styrene block copolymer, ethylene-propylene rubber, and plasticized poly (vinyl chloride) (hereinafter PVC) and (b) a polymer or oligomer having end groups capable of further reaction with one another under the influence of atmospheric moisture, e.g. 10–100% relative humidity for at least 5 minutes, such as polyesters or polyethers or polybutadienes terminated with isocyanate or trialkoxysilyl end groups. The materials can be extruded or otherwise molded into the desired shape in which they are to be finally used, while being protected from exposure to moisture or other active hydrogen-containing compounds. The shaped article of the materials is then allowed to undergo further reaction under the influence of liquid water or ambient moisture, producing what is believed in the preferred embodiments to be an essentially thermoset IPN structure with excellent resistance to environmental degradation. The blend of materials may be stored in a covered drum or a sealable plastic bag in a single large mass, or in pellet form for later processing into the desired final product; here again the blend of materials must be protected from moisture during storage.

Optional components of the materials according to this invention include plasticizers, accelerators for the cross linking reaction, surfactants, and fillers.

More specifically, the gasket 10 is formed from a mixture, comprising (a) a first component which is a primary polymer having a polyester backbone and isocyanate end groups that are capable of chemically reacting with each other in the presence of moisture to form a derivative polymer having a longer average chain length than said primary polymer and (b) a second component which is a non-crosslinked elastomer that is not substantially chemically reactive with itself or with said first component in the presence of moisture, wherein said first and said second components are intimately mixed to form said composition of matter. The composition, when maintained in the absence of moisture and other active hydrogen donor materials, is a readily extrudable and otherwise conventionally moldable thermoplastic composition, but which, upon exposure to moisture, becomes essentially thermoset. The said second component is selected from the group consisting of styrene-isoprene-styrene block polymers, styrene-butadiene-styrene block polymers, isoprene homopolymers, and polyvinyl chloride, polyisobutylene, styrene-ethylene-butylene-styrene, and ethylene-propylene rubber. When the compositions are exposed to moisture it, becomes essentially thermoset. The amount of unextractable material exceeds the original amount of the uncured (but curable) prepolymer in said composition, when the essentially thermoset material is extracted by refluxing the material for one hour in a solvent that would have dissolved all of said first and second components prior to exposure of the composition to said moisture.

Figure 4:
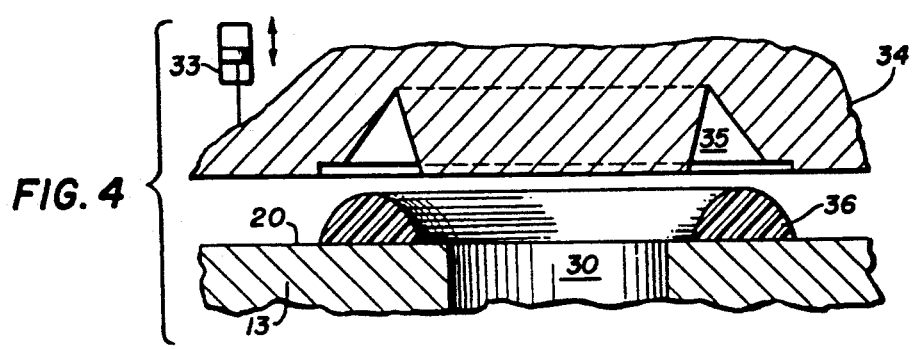
FIG. 4 is a sectional view of apparatus for forming the gasket by a first method.

FIG. 4 shows an apparatus for forming the gasket 10 on the surface 20 of an article, such as the flange 13 of the article 12. An elongated initial bead 36 is placed on the surface 20 by extrusion. A mold 34 is moved downwardly by a robot, cylinder 33 or the like. Eventually, an elongated cavity 35 in the mold, comes in contact with the bead 36 and causes it to conform to the shape of the cavity. The cross-sectional shape of the cavity is selected to be the same as the desired cross-sectional shape of the finished gasket 10. Generally speaking, the area of the cross-section of the cavity is the same as the area of the cross-section of the initial bead, except that the bead may contain a little more material in the center portion than the cavity, so that flow may take place lengthwise to fill any deficiency at the "start and stop" location of the extended bead. Ideally, when longitudinal flow has taken place completely, the volume of material in the final bead or gasket should be the same as the volume of the elongated cavity 35 and there should be no sign of the place where the ends of the initial bead came together when the mold is then removed by the cylinder 33.

Figure 5:
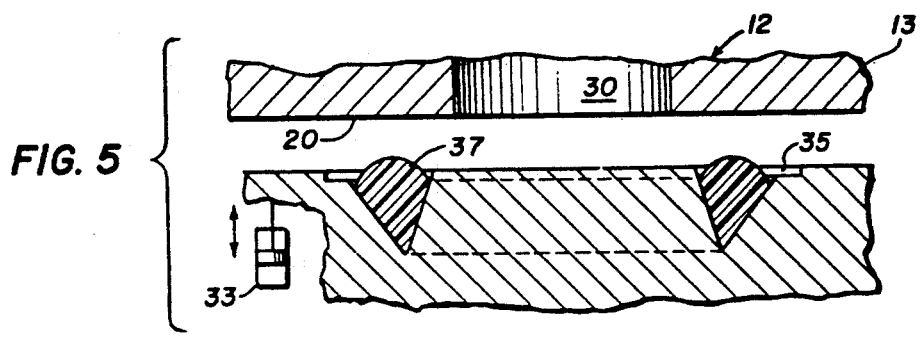
FIG. 5 is a sectional view of apparatus for forming the gasket by a second method.

FIG. 5 is a schematic view showing apparatus for performing another method of applying the gasket 10 to the surface 20 of an article, such as the flange 13 of the article 12. The initial bead 37 is placed by extrusion in the elongated cavity 35 of the mold 34. The mold is then pressed into contact with the surface 20 by the cylinder 33 and is later moved away, leaving the formed gasket on the surface. A release coating of the well-known type may be applied to the surface of the cavity to facilitate removal from the gasket which adheres to the surface 20. It can be seen, then, that the initial bead 37 has substantially the same cross-sectional area as the cavity 35, so that, when the re-distribution takes place, the cavity is completely filled and there are neither empty spaces or overfill.

Figure 6:
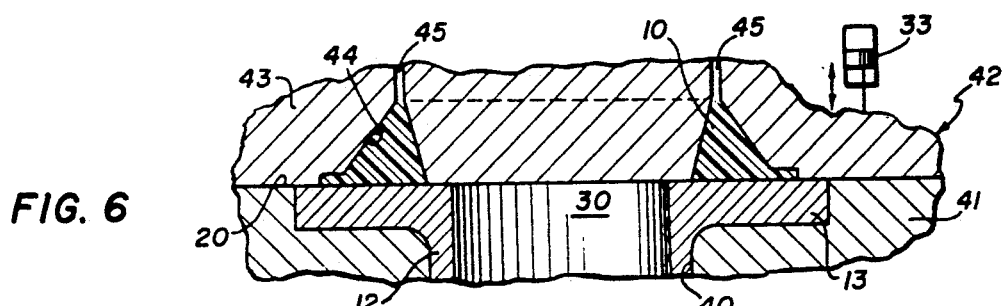
FIG. 6 is a sectional view of apparatus for forming the gasket by a third method.

FIG. 6 illustrates apparatus for performing another method of applying the gasket 10 to the surface 20 of the flange 13 forming part of the article 12. The article 12 is placed in a suitable recess 40 in a part 41 of a two-part mold 42 in such a way that the surface 20 is flush with the parting plane of the mold and so that the recess 40 is completely filled by the article 12. The other part 43 of the mold is provided with an elongated cavity 44 which has the shape desired in the final gasket 10; this desired shape relates not only to the cross-section but also the general configuration which is shown as an annulus in the illustration. Runners 45 enter the cavity 44 at various points for the introduction of the gasket material by injection. After the two mold parts 41 and 43 have been brought together by a means, such as the cylinder 33, the cavity 44 and the surface 20 form a shaped enclosure into which the gasket material is injected under pressure through the runners 45. The mold part 43 is then drawn away from the other mold part 41 and from the surface 20, thus leaving the gasket 10 in place on the article 12.

Figure 7:
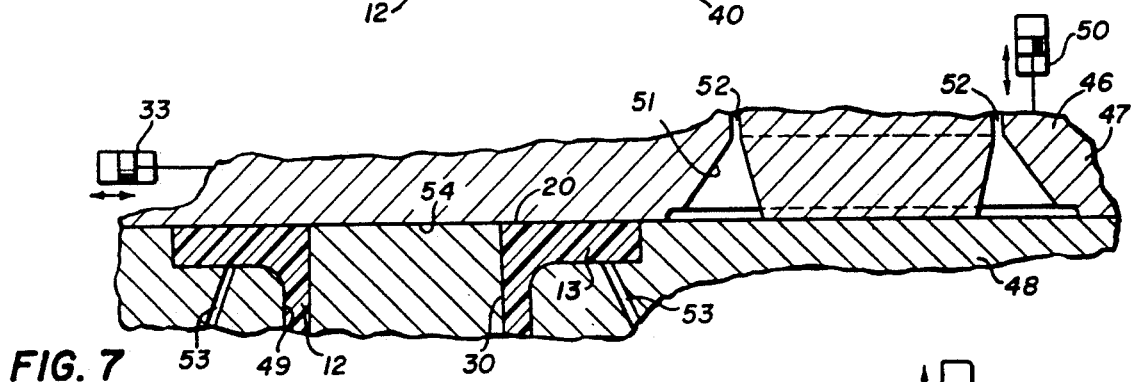
FIGS. 7 and 8 are cross-sections of apparatus for forming the gasket by a fourth method.
Figure 8:
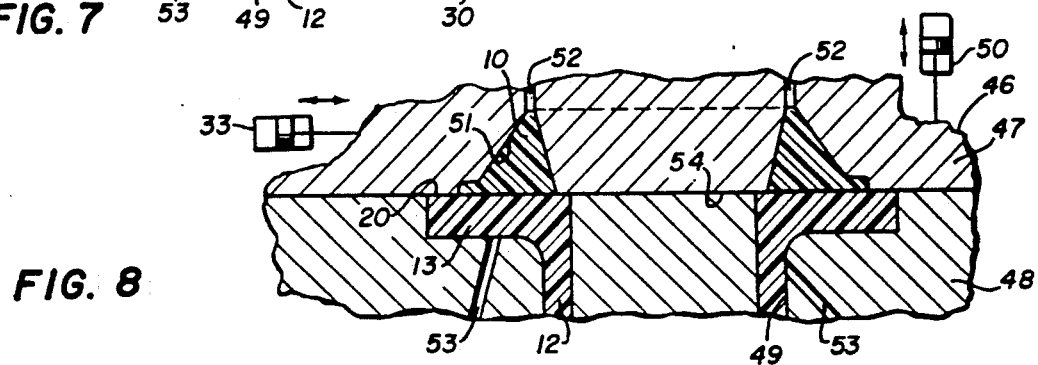

FIGS. 7 and 8 illustrate a still further apparatus for carrying out the principles of the present invention. A two-part mold 46, including an upper part 47 and a lower part 48, are slidable along the parting line by means, such as the cylinder 33, into a first relative position (FIG. 7) and a second position (FIG. 8). The lower part 48 is provided with a recess 49 shaped to exactly reproduce the article 12 in such a way that the surface 20 of its flange 13 lies along the parting line of the mold. The upper part 47 of the mold is provided with an elongated cavity 51 having the conformation of the finished gasket 10. Suitable runners 52 extend into the cavity 51 for the introduction of gasket material, while similar runners 53 enter the recess 49 for the introduction of the article material. The cylinder 32 provides for lateral movement of the mold parts 47 and 48, while a cylinder 50 operates to bring about movement at a right angle to the parting line.

The article 12 is first formed with the mold 46 in the condition shown in FIG. 7; the elongated cavity 51 is located away from the recess 49, so that the parting line surface 54 of the upper part 47 of the mold forms a closed chamber with the recess 49. Low-viscosity plastic material, such as uncured PVC, is injected into that chamber by means of the runners 53 and the plastic material is allowed to harden. Once the article 12 has reached a necessary hardness, the cylinder 33 acts to slide the upper part 47 of the mold from the initial position shown in FIG. 7 to the second position shown in FIG. 8. At that time the cavity 51 and the surface 20 of the article 12 form an enclosure or gasket chamber into which the gasket material can be injected by means of the runners 52.

When the gasket material has completely filled the gasket chamber and the material has cured to a suitable hardness (if such be necessary), the upper part 47 of the mold is moved away from the lower part 48. This movement is at a right angle to the parting line surface 54 and takes place under the impetus of the cylinder 50. The movements provided by the cylinders 33 (lateral) and 50 (right angle) can take place, of course, by any suitable means, such as a robot. In any case, the movement of the upper part 47 away from the lower part 48 serves to leave the finished gasket 10 on the surface 20 of the article 12. The article is then removed from the recess 49 of the mold in the usual way, carrying the finished gasket with it.

FIGS. 9, 10, 11 and 12 are flow charts that show the various method steps carried out by the apparatus shown in FIGS. 4, 5, 6 and 7 respectively. Since these illustrations are schematic, no attempt has been made to show the cavity in the intricate shape used in the other figures of drawings.

Figure 9:
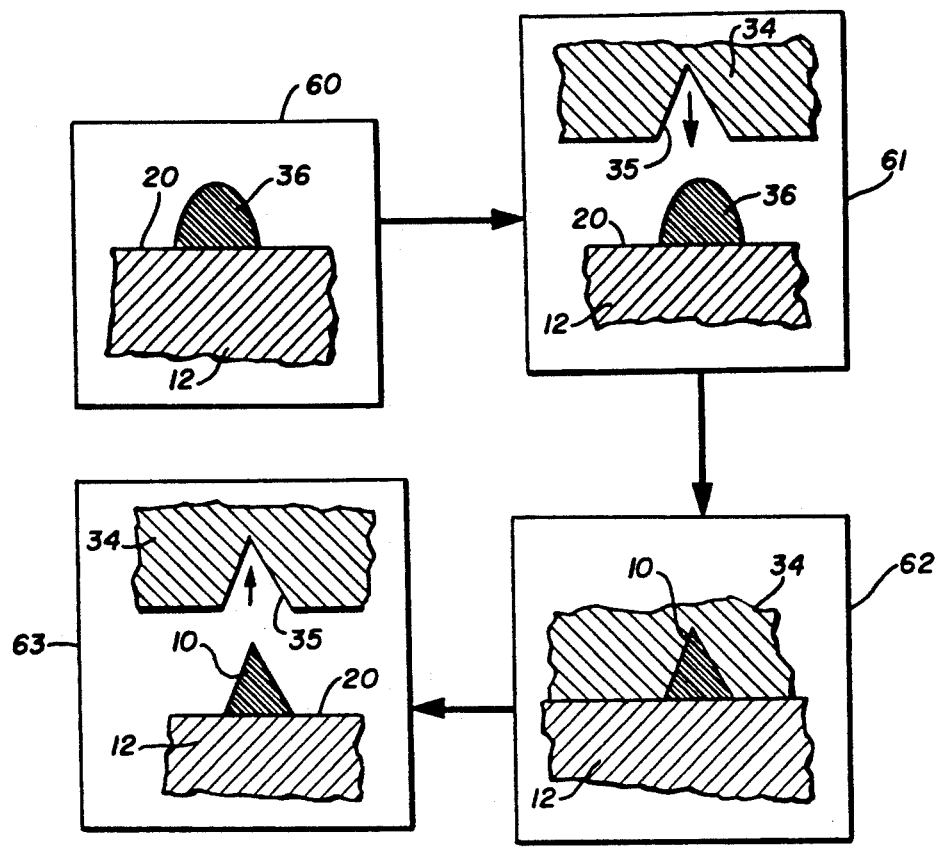
FIG. 9 is a flow chart showing the steps of forming the gasket by the first method.

FIG. 9, which illustrates the steps carried out in the operation of the apparatus shown in FIG. 4, starts off with Step 60 which consists of extruding the initial bead 36 onto the surface 20 of the article 12. The next step is Step 61 in which the mold 34, which has elongated cavity 35, is moved toward the surface 20 of the article 12 and toward the initial bead 36 of gasket material. The cross-sectional area of the initial bead 36 is substantially the same as the cross-sectional area of the cavity 35, as has been explained above; this is true only if the finished gasket is to be of uniform cross-sectional shape and size throughout. If the gasket is to vary from place to place, suitable compensation must take place in the cavity 35, so that the cross-sectional areas of the cavity and bead are the same from point-to-point.

Step 62 now takes place and consists of bringing the mold into contact with the article 12, thus completing the formation of the finished gasket 10. In Step 63, the mold 34 is moved away from the article 12, thus separating the cavity 35 from the finished gasket 10. The gasket remains in the surface 20 of the article and is subsequently cured, if necessary. During Step 62 the initial bead 36 is not only plastically deformed in the lateral directions to conform to the cross-sectional shape of the cavity 35, but the material may also flow longitudinally of the cavity to remedy any deficiencies in cross-sectional shape or size, particularly at the "start-and-stop" position.

Figure 10:
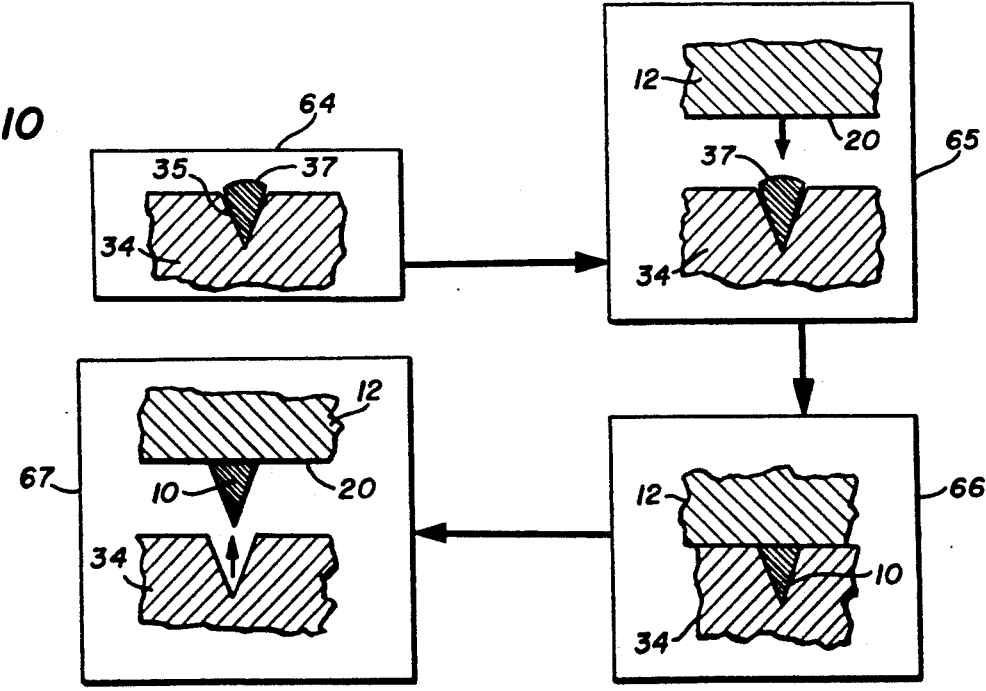
FIG. 10 is a flow chart showing the steps of forming the gasket by the second method.

FIG. 10 shows the method steps used in operating the apparatus of FIG. 5. To begin with, in Step 64 the initial bead 37 is deposited by extrusion in the elongated cavity 35. The bead at this point may not adapt completely to the shape of the cavity, because of the high viscosity of the material. In Step 65, the article 12 with its surface 20 is moved toward the mold 34 and the initial bead 37. Step 66 consists of completing the movement of the article toward the mold, so that the surface 20 presses the initial bead 37 and causes the material to flow into all parts of the cavity 35, the flow taking place both laterally and longitudinally, as may be necessary and as has been explained more fully above. Finally, in Step 67 the article 12 is lifted from the mold, carrying the finished gasket 10 with and attached to the surface 20 by adhesion. Suitable release agents, etc., can be used in the cavity 35 before the gasket material is introduced into it to facilitate separation of the gasket from the cavity.

Figure 11:
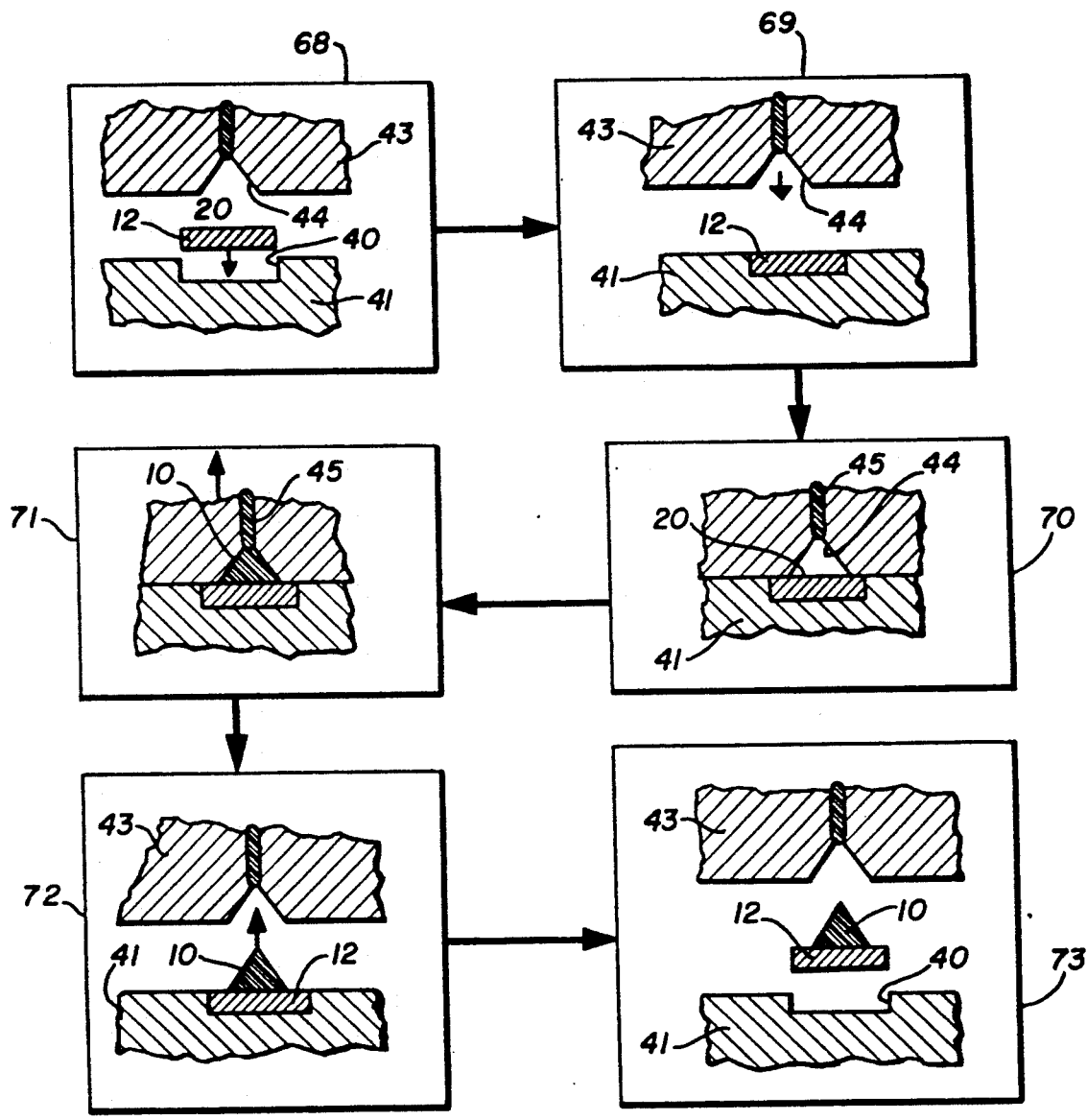
FIG. 11 is a flow chart showing the steps of forming the gasket by the third method.

FIG. 11 illustrates the steps of operating the apparatus of FIG. 6. In Step 68, the article 12 (shown schematically) is placed in the recess 40 provided for in the lower mold part 41. In Step 69, the upper mold part 43 (with the elongated cavity 44) is moved toward the lower mold part 41 and toward the article 12. Step 70 consists in completing the movement, so that the cavity 44 and the surface 20 of the article form an enclosure, the only entry being via the runner 45. In Step 71, the gasket material is injected through the runner 45 into the enclosure to form the finished gasket 10. Then, Step 72 is carried out by removing the upper mold part 43 from the lower mold part 41, leaving the article 12 and the finished gasket 10 behind. Finally, in accordance with Step 73, the article and gasket in the completed form are removed from the recess 40 of the lower mold part 41.

Figure 12:
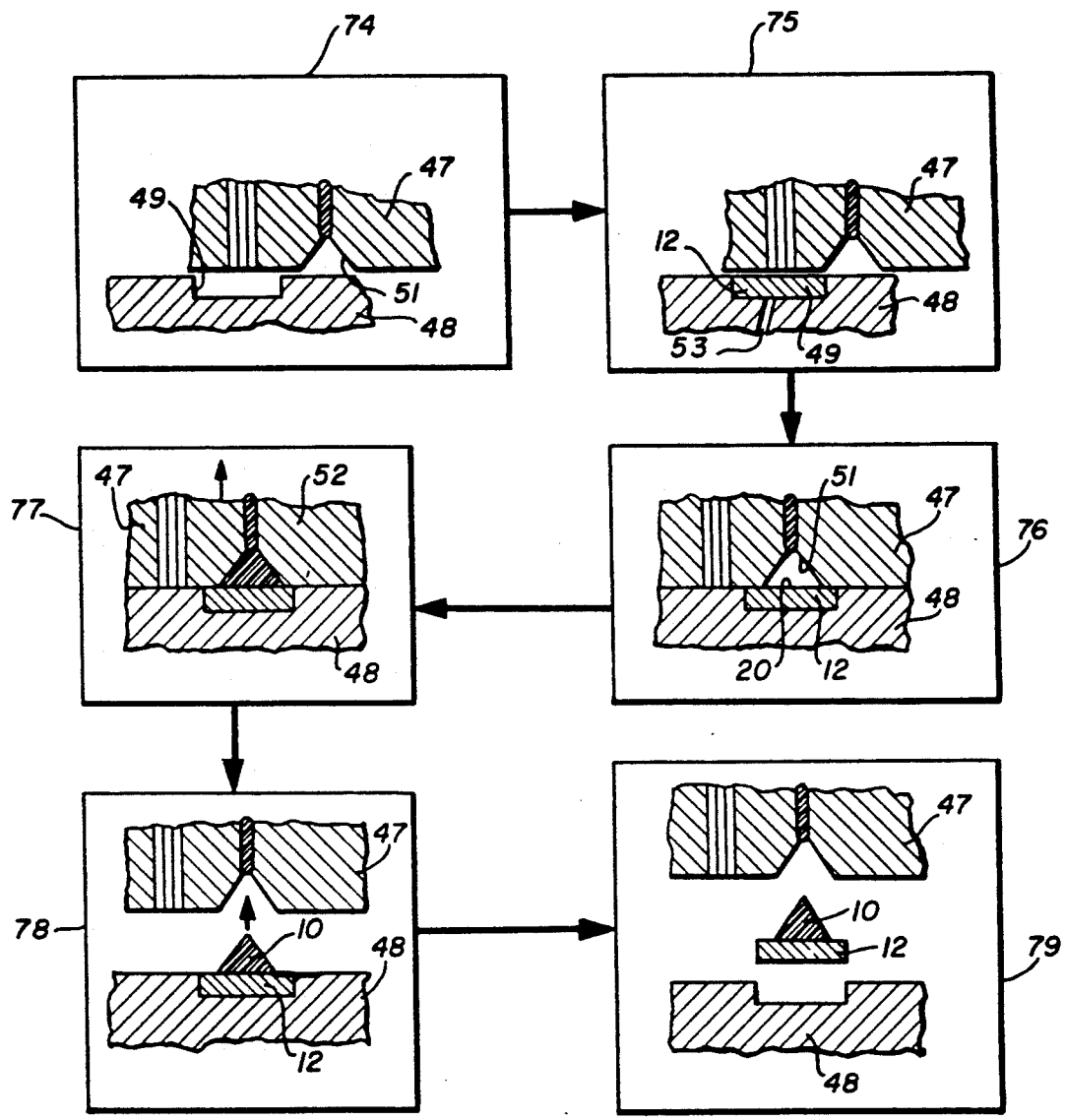
FIG. 12 is a flow chart showing the steps of forming the gasket by the fourth method.

FIG. 12 shows the method steps used in the operation of the apparatus shown in FIGS. 8 and 9. It can be seen that, in the first Step 74, the upper mold part 47 is located laterally of the lower mold part 48 in a first position. In that position, the cavity 35 in upper mold part 47 is not in communication with the recess 49 in the lower mold part 48. In Step 75, plastic is injected through the runner 53 into the recess 49 to form the article 12. Step 76 consists of moving the part 47 laterally of the part, so that the elongated cavity 51 lies over the surface 20 of the finished article 12 to form a complete enclosure therewith. In Step 77, the gasket material is injected into that enclosure through the runner 52. In accordance with Step 78, the upper mold part 47 is then lifted away from the lower mold part 48, leaving the article 12 and the finished gasket 10 behind, with the latter part. Finally, in Step 79, the article 12, bearing the finished gasket 10, is removed from the lower mold part 48.

It should be understood that the orientation of the elements described above is only for the purpose of illustration and that all of the methods could be carried in any orientation if suitable adjustment be made in the gasket material, the cavity, the article surface, etc..

The advantages of the present invention will now be clearly understood in view of the above description. For instance, it is possible by the practice of the invention to assure that a gasket is accurately formed in place on an article, which gasket has a selected shape and size throughout its length. In many cases, where the gasket is in the shape of a closed figure, the cross-sectional shape and area will be the same throughout the entire length. Even when the initial bead is formed by applying an extrusion of the material onto the article surface, the "start-and-stop" location in the finished gasket will be formed without a discontinuity. Furthermore, by the practice of the @invention, it is possible to form a gasket that lies along a surface that has more than a single plane configuration, while maintaining a consistent cross-sectional shape and area. In addition, in those cases where is desired to provide a gasket whose shape or size varies from one location to another, it is possible to do so accurately and consistently by use of the invention apparatus and methods.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A method of forming a flexible gasket directly onto a surface of at least one part of a mating multipart article, comprising the steps of:
    (a) forming an elongated bead on a surface of at least one part of a mating multipart article of an extrudable thermoplastic mixture which is moisture curable to form a thermoset polymer, the polymeric material being extruded in a predetermined configuration and volume, wherein the thermoplastic mixture is formed by combining a first and a second component, wherein the first component is a moisture curable polymer which, when exposed to moisture, becomes thermoset; and the second component is a non-crosslinked elastomer;
    (b) contacting the bead and the surface with a mold having a primary mold cavity of the same general configuration and volume as the bead, and the cross-sectional configuration and dimensions of the finished gasket, the contact resulting in a continuous gasket with no visible seam therein; and
    (c) exposing the shaped thermoplastic gasket to moisture thereby bringing about polymerization of the thermoplastic mixture which renders the mixture thermoset.

2. The method of claim 1, wherein
    (a) the first component of the thermoplastic mixture is a primary polymer having a polyester backbone and isocyanate end groups that are capable of chemically reacting with each other in the presence of moisture to form a derivative polymer having a longer average chain length than the primary polymer; and (b) the second component of the thermoplastic mixture is a non-crosslinked elastomer that is not substantially chemically reactive with itself or with the first component in the presence of moisture, wherein the first and the second are intimately mixed to form the thermoplastic mixture; the thermoplastic mixture when maintained in the absence of moisture and other active hydrogen donor materials, is a readily extrudable and otherwise conventionally moldable thermoplastic composition, but which, upon exposure to moisture, becomes essentially thermoset.

3. The method of claim 2, wherein the second component is selected from the group consisting of styrene-isoprene-styrene block polymers, styrene-butadiene-styrene block polymers, isoprene homopolymer, polyvinyl chloride, polyisobutylene, styrene-ethylene-butylene-styrene, and ethylene-propylene rubber.

4. The method of claim 3, wherein the thermoplastic mixture when exposed to a relative humidity of 10% to 100% for at least 5 minutes, or when submerged in water at 0° C. to 100° C., the polymer mixture becomes an essentially thermoset elastomeric material.

5. A method of forming a flexible gasket directly onto a surface of at least one part of a mating multipart article, comprising the steps of:

(a) extruding an elongated bead of an extrudable thermoplastic mixture which is moisture curable to form a thermoset polymer in a predetermined configuration and volume, the extruding being into a primary mold cavity which is one part of a mating multipart article of the same general configuration and volume as the bead and of the same general cross-sectional configuration and dimensions as the unfinished gasket, wherein the thermoplastic mixture is formed by combining a first and a second component, wherein the first component is a moisture curable polymer which, when exposed to moisture, becomes thermoset; and the second component is a non-crosslinked elastomer;

(b) contacting the bead with a surface of the multi-part article, the contact, the contact resulting in a continuous gasket with no visible seam therein; and (c) exposing the shaped thermoplastic gasket to moisture thereby bringing about polymerization of the thermoplastic mixture which renders the mixture thermoset.

6. The method of claim 5, wherein (a) the first component of the thermoplastic mixture is a primary polymer having a polyester backbone and isocyanate end groups that are capable of chemically reacting with each other in the presence of moisture to form a derivative polymer having a longer average chain length than the primary polymer; and (b) the second component of the thermoplastic mixture is a non-crosslinked elastomer that is not substantially chemically reactive with itself or with the first component in the presence of moisture, wherein the first and the second are intimately mixed to form the thermoplastic mixture; the thermoplastic mixture when maintained in the absence of moisture and other active hydrogen donor materials, is a readily extrudable and otherwise conventionally moldable thermoplastic composition, but which, upon exposure to moisture, becomes essentially thermoset.

7. The method of claim 6, wherein the second component is selected from the group consisting of styrene-isoprene-styrene block polymers, styrene-butadiene-styrene block polymers, isoprene homopolymer, polyvinyl chloride, polyisobutylene, styrene-ethylene-butylene-styrene, and ethylene-propylene rubber.

8. The method of claim 7, wherein the thermoplastic mixture when exposed to a relative humidity of 10% to 100% for at least 5 minutes, or when submerged in water at 0° C. to 100° C., the polymer mixture becomes an essentially thermoset elastomeric material.

9. A method of forming a flexible gasket directly onto a surface of at least one part of a mating multipart article, comprising the steps of:

(a) forming one part of a multi-part article in a secondary cavity in a closed mold with a surface exposed to a primary mold cavity;

(b) injecting an injectable thermoplastic mixture which is moisture curable to form a thermoset polymer in a predetermined configuration and volume, the injecting being into the primary mold cavity which comprises a second part of the mating multi-part article and is of the cross-sectional configuration and dimensions as the finished gasket, wherein the thermoplastic mixture is formed by combining a first and a second component, wherein the first component is a moisture curable polymer which, when exposed to moisture, becomes thermoset; and the second component is a non-crosslinked elastomer;

(c) contacting the primary mold cavity with the surface, the contact resulting in a continuous gasket with no visible seam therein; and (d) exposing the shaped thermoplastic gasket to moisture thereby bringing about polymerization of the thermoplastic mixture which renders the mixture thermoset.

10. The method of claim 9, wherein (a) the first component of the thermoplastic mixture is a primary polymer having a polyester backbone and isocyanate end groups that are capable of chemically reacting with each other in the presence of moisture to form a derivative polymer having a longer average chain length than the primary polymer; and (b) the second component of the thermoplastic mixture is a non-crosslinked elastomer that is not substantially chemically reactive with itself or with the first component in the presence of moisture, wherein the first and the second are intimately mixed to form the thermoplastic mixture; the thermoplastic mixture when maintained in the absence of moisture and other active hydrogen donor materials, is a readily extrudable and otherwise conventionally moldable thermoplastic composition, but which, upon exposure to moisture, becomes essentially thermoset.

11. The method of claim 10, wherein the second component is selected from the group consisting of styrene-isoprene-styrene block polymers, styrene-butadiene-styrene block polymers, isoprene homopolymer, polyvinyl chloride, polyisobutylene, styrene-ethylene-butylene-styrene, and ethylene-propylene rubber.

12. The method of claim 11, wherein the thermoplastic mixture when exposed to a relative humidity of 10% to 100% for at least 5 minutes, or when submerged in water at 0° C. to 100° C., the polymer mixture becomes an essentially thermoset elastomeric material.

13. The method of claim 11, wherein the part of the multi-part article of step (a) is formed in situ.

14. The method of claim 13, wherein
   (a) the first component of the thermoplastic mixture is a primary polymer having a polyester backbone and isocyanate end groups that are capable of chemically reacting with each other in the presence of moisture to form a derivative polymer having a longer average chain length than the primary polymer; and
   (b) the second component of the thermoplastic mixture is a non-crosslinked elastomer that is not substantially chemically reactive with itself or with the first component in the presence of moisture, wherein the first and the second are intimately mixed to form the thermoplastic mixture; the thermoplastic mixture when maintained in the absence of moisture and other active hydrogen donor materials, is a readily extrudable and otherwise conventionally moldable thermoplastic composition, but which, upon exposure to moisture, becomes essentially thermoset.

15. The method of claim 14, wherein the second component is selected from the group consisting of styrene-isoprene-styrene block polymers, styrene-butadiene-styrene block polymers, isoprene homopolymer, polyvinyl chloride, polyisobutylene, styrene-ethylene-butylene-styrene, and ethylene-propylene rubber.

16. The method of claim 15, wherein the thermoplastic mixture when exposed to a relative humidity of 10% to 100% for at least 5 minutes, or when submerged in water at 0° C. to 100° C., the polymer mixture becomes an essentially thermoset elastomeric material.

* * * * *